(12) United States Patent
Nagapudi et al.

(10) Patent No.: US 9,971,617 B2
(45) Date of Patent: May 15, 2018

(54) VIRTUAL APPLIANCE ON A CHIP

(71) Applicant: Ampere Computing LLC, Santa Clara, CA (US)

(72) Inventors: Venkatesh Nagapudi, Milpitas, CA (US); Satsheel B. Altekar, San Jose, CA (US)

(73) Assignee: Ampere Computing LLC, Santa Clara, CA (US)

( * ) Notice: Subject to any disclaimer, the term of this patent is extended or adjusted under 35 U.S.C. 154(b) by 284 days.

(21) Appl. No.: 13/838,624

(22) Filed: Mar. 15, 2013

(65) Prior Publication Data

US 2017/0097838 A1 Apr. 6, 2017

(51) Int. Cl.
| | |
|---|---|
| *G06F 9/455* | (2018.01) |
| *H04L 29/08* | (2006.01) |
| *G06F 9/22* | (2006.01) |
| *H04L 12/701* | (2013.01) |
| *H04L 29/06* | (2006.01) |

(52) U.S. Cl.
CPC .......... *G06F 9/45558* (2013.01); *G06F 9/223* (2013.01); *H04L 67/02* (2013.01); *G06F 2009/45579* (2013.01); *G06F 2009/45595* (2013.01); *H04L 45/00* (2013.01); *H04L 63/20* (2013.01); *H04L 67/1002* (2013.01)

(58) Field of Classification Search
None
See application file for complete search history.

(56) References Cited

U.S. PATENT DOCUMENTS

| 8,804,523 | B2 * | 8/2014 | Kim | H04L 47/11 370/235 |
|---|---|---|---|---|
| 2010/0306773 | A1 * | 12/2010 | Lee | G06F 9/5077 718/1 |
| 2011/0153822 | A1 * | 6/2011 | Rajan | G06F 9/5055 709/225 |
| 2011/0243143 | A1 * | 10/2011 | Kwon | H04L 41/5041 370/400 |

OTHER PUBLICATIONS

Varanasi et al., "Hardware-Supported Virtualization on ARM", Jul. 11-12, 2011, APSys '11 Proceedings of the Second Asia-Pacific Workshops on Systems Article No. 11.*

* cited by examiner

*Primary Examiner* — Kenneth Tang
(74) *Attorney, Agent, or Firm* — Alston & Bird LLP (57) ABSTRACT

Various embodiments provide for a system that integrates 64 bit ARM cores and a switch on a single chip. The RISC style processors use highly optimized sets of instructions rather than the specialized set of instructions found in other architectures (e.g., x86). The system also includes multiple high bandwidth ports that enable multi-ported virtual appliances to be built using a single chip. The virtual appliances are software implemented versions of the physical appliances that are installed with servers to provide network services such routing and switching services, firewall, VPN, SSL, and other security services, as well as load balancing. The virtual appliances are implemented in software and the system can add new virtual appliances, or change the functions performed by existing virtual appliances flexibly without having to install or remove physical hardware.

19 Claims, 10 Drawing Sheets

VIRTUAL APPLIANCE ON A CHIP

TECHNICAL FIELD

The subject disclosure relates generally to virtual appliances that perform network services on a chip.

BACKGROUND

One area of computing that is experiencing massive growth is the datacenter industry where servers store information and provide cloud computing processing. As people increasingly store personal information and use cloud services to process and analyze data, large numbers of servers are purchased, installed, replaced, upgraded, and so forth on a regular basis, which is costly for datacenter operators.

Most servers currently being used are built around processors using x86 architecture. The servers include many appliances that perform network services such as routing and switching services, firewall, VPN, SSL, and other security services, as well as load balancing. These appliances are generally implemented using specially designed hardware such as Application-Specific Integrated Circuits ("ASICs") or Field Programmable Gate Arrays ("FPGAs"). These appliances often have only a limited number of high speed ports, and so the scalability of the appliances is limited. To increase the capacity of the datacenter, new appliances are required to be installed, increasing the cost and decreasing the flexibility of the datacenter.

The above-described description is merely intended to provide a contextual overview of current techniques for performing network services using a virtual appliance and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises a microprocessor comprising a set of cores, and a virtual appliance configured for performing a network service. The system also includes a hypervisor that is configured for facilitating execution of the virtual appliance on one or more of the cores and for selecting the network service for the virtual appliance to perform from a plurality of network services.

In another example embodiment, a method comprises determining a network service to be performed by a virtual appliance. The method also includes selecting one or more cores of a microprocessor to execute the virtual appliance. The method further includes facilitating execution of the virtual appliance.

In an example embodiment, a non-transitory computer readable storage device that includes computer executable instructions, that in response to execution, causes a computing device to perform operations. The operations include determining a network service to be performed by a virtual appliance. The operations also include selecting a virtual appliance to perform the network service, and selecting one or more cores of a microprocessor to execute the virtual appliance. The operations further include facilitating execution of the virtual appliance.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various embodiments provide for a system that integrates 64 bit ARM architecture ("ARM64") cores and a switch on a single chip. The Reduced Instruction Set Computing ("RISC") style ARM64 processors use highly optimized sets of instructions rather than the specialized sets of instructions found in other architectures (e.g., x86). The system also includes multiple high bandwidth ports that enable multi-ported virtual appliances to be built using a single chip. The virtual appliances are software implemented versions of the physical appliances that are installed with servers to provide network services such routing and switching services, firewall, VPN, SSL, and other security services, as well as load balancing and WAN optimizing.

Since the virtual appliances are implemented in software, the system can add new virtual appliances, or change the functions performed by existing virtual appliances flexibly without having to install or remove physical hardware (e.g., ASICs, FPGAs and etc). Servers built with the ARM64 cores are thus scalable and flexible through the use of software virtualization.

One or more virtual appliance can run on the set of cores on the chip. In some embodiments, there can be as many as 16 ARM64 cores operating on the chip. Through the use of a hypervisor, which is a virtual machine manager that creates and runs virtual machines (e.g., virtual appliances), the cores can execute or facilitate execution of a plurality of virtual appliances.

Figure 1:
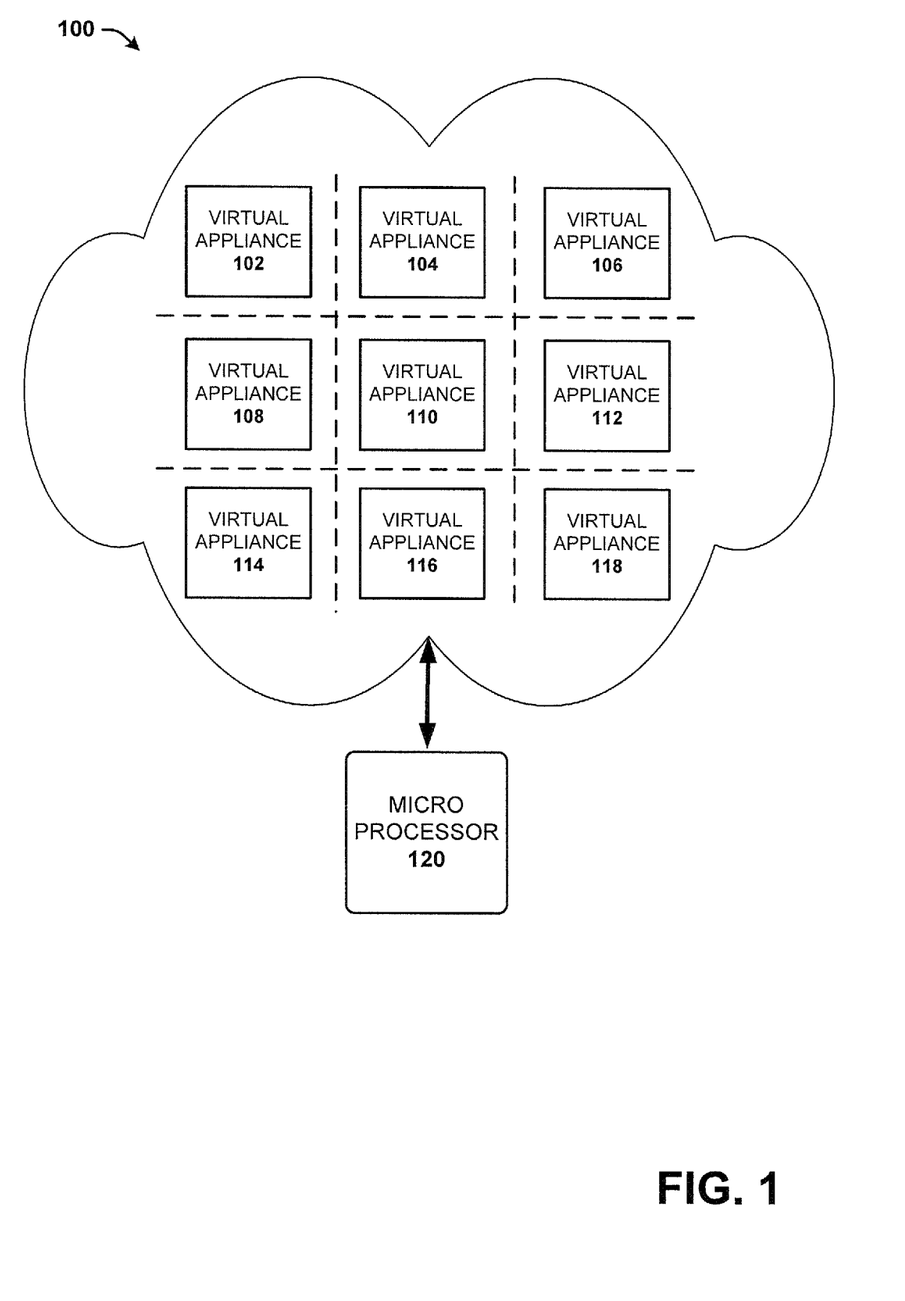
FIG. 1 is a block diagram illustrating an example, non-limiting embodiment of a scalable server system in accordance with various aspects described herein.

Turning now to FIG. 1, a block diagram illustrating an example, non-limiting embodiment of a scalable server system in accordance with various aspects described herein is shown. System 100 includes a microprocessor 120 that facilitates execution of a plurality of virtual appliances 102, 104, 106, 108, 110, 112, 114, 116, and 118.

A hypervisor (shown in more detail in FIG. 2) manages the virtual appliances 102-118. The virtual appliances 102-118 perform a variety of network services depending on the server requirements. For instance, if the server requires packet switching or routing, one or more of the virtual appliances 102-118 can perform switching or routing tasks. In some embodiments, the virtual appliances can perform network services based on applications running on the server.

It is to be appreciated that while system 100 depicts nine virtual appliances being executed by microprocessor 120, in other embodiments, more than or fewer than nine virtual appliances can be executed by microprocessor 120. For instance, microprocessor 120 can execute one virtual appliance if only one network service is required to be performed. In other embodiments, microprocessor 120 can facilitate the execution of many more virtual appliances, limited only by the processing power of microprocessor 120.

Some of the network services that virtual appliances 102-118 can perform include routing and switching services, firewall, VPN, SSL, and other security services, as well as load balancing and WAN optimizing. These include some of the basic building block functions for a network. Since the virtual appliances are software configurable, they can be replaced and added as needed, which allows the server to be scalable by replacing physical hardware such as ASIC and FPGA based solutions with software virtualized appliances.

Figure 2:
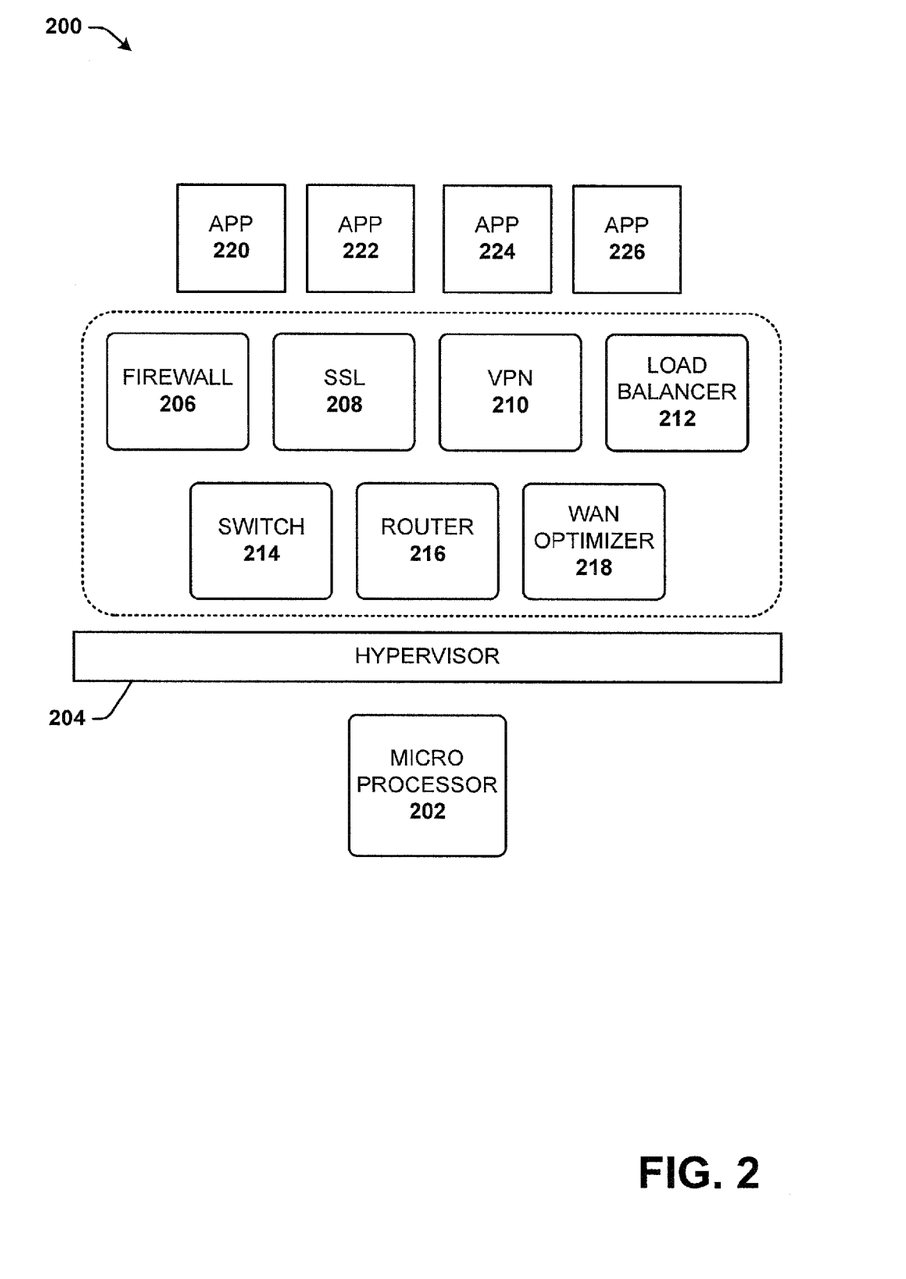
FIG. 2 is a block diagram illustrating an example, non-limiting embodiment of a system that runs virtual appliances to perform network services in accordance with various aspects described herein.

Turning now to FIG. 2, a block diagram illustrating an example, non-limiting embodiment of a system that runs virtual appliances to perform network services in accordance with various aspects described herein is shown. System 200 includes a microprocessor 202 with a hypervisor 204 that facilitates management of a plurality of virtual machines. The hypervisor 204 can be implemented in computer software, firmware and/or hardware.

The hypervisor 204 facilitates the execution of virtual appliances 206, 208, 210, 212, 214, 216, and 218, as well as virtual machines 220, 222, 224, and 226 that run a variety of applications. It is to be appreciated that the hypervisor 204 can deactivate or remove the virtual appliances 206-118 as needed depending on the network services that are performed. Hypervisor 204 can also operate multiple instances of one or more of virtual appliances 206-218 as needed. For instance, hypervisor 204 can run multiple instances of firewall virtual appliance 206 if there is a need for additional network services for firewalls.

Hypervisor 204 can activate and deactivate virtual appliances 206, 208, 210, 212, 214, 216, and 218 based on which apps 220, 222, 224, and 226 (among others), are being executed by microprocessor 202 via hypervisor 204. For instance, if an application requires data to be transported over a secure connection, hypervisor 204 can activate or facilitate execution of one or more instances of virtual appliance 208 and 210 which provide SSL and VPN network services respectively. When there is no longer a need for a secure connection, hypervisor 204 can deactivate or remove virtual appliances 208 and 210. Similar activations and deactivations of other virtual appliances can be undertaken based on the requirements of other applications.

In other embodiments, hypervisor 204 can activate and deactivate virtual appliances 206, 208, 210, 212, 214, 216, and 218 based on information associated with a customer or user profile. Customer accounts and/or user profiles can include preference information, and hypervisor 204, can determine an identity of a customer or user utilizing the microprocessor or running one or more of the apps 220, 222, 224, and/or 226. Based on the identity and associated preference information, hypervisor 204 can then activate or deactivate one or more of the virtual appliances 206, 208, 210, 212, 214, 216, and 218.

Virtual appliance 214 can be a software defined switch ("SDN Switch") that provides switch services to transfer packets to and from devices, creating a network. The switch 214 can transfer packets to other chips, cores, or memory (shown in more detail in FIGS. 5 and 6). The SDN Switch can also be utilized by router 216 to transfer packets of data to and from other networks. Facilitating the implementation of the SDN Switch and the other virtual appliances are a large number of high bandwidth ports accessible by microprocessor 202 to transfer data. In some embodiments, as many as twenty-four 10GE ports can be accessible by the cores to facilitate the SDN Switching. In other embodiments, other numbers of ports are possible, including 1 GE ports.

Figure 3:
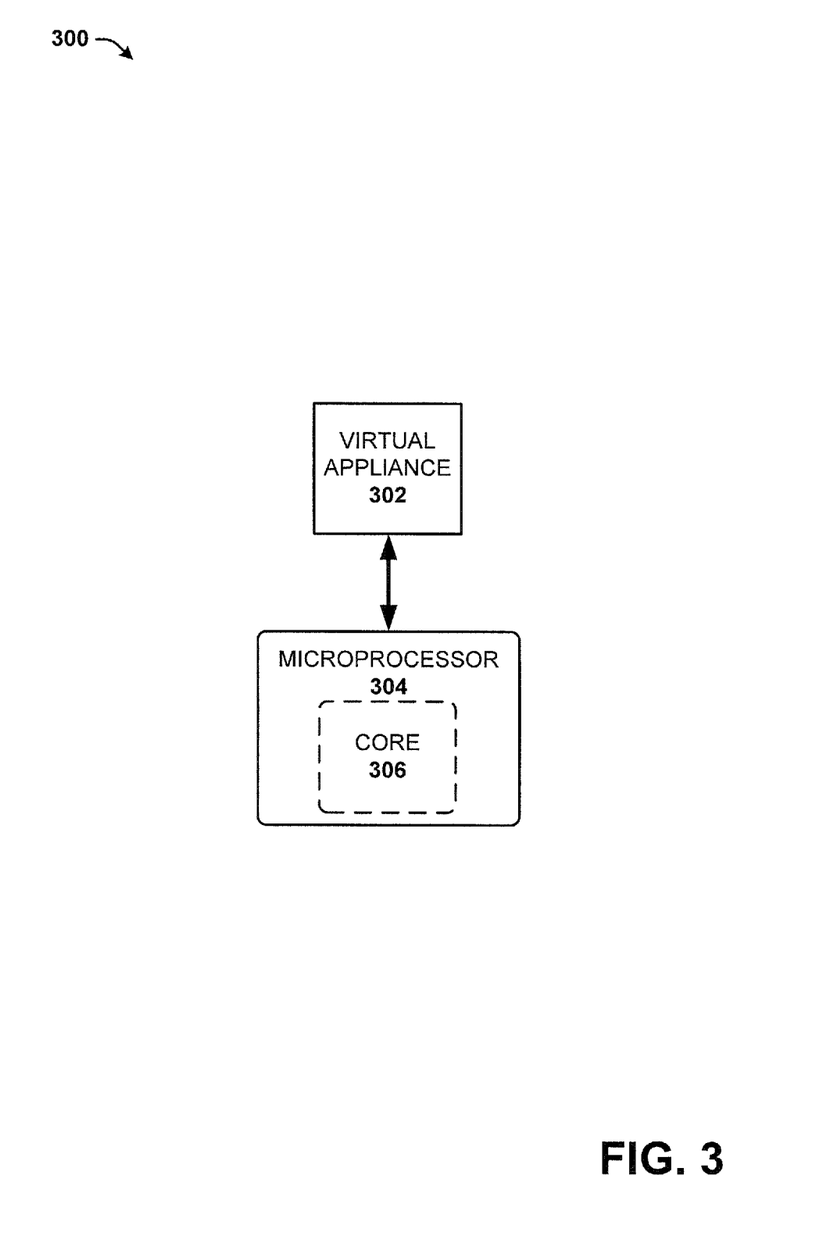
FIG. 3 is a block diagram illustrating an example, non-limiting embodiment of a system that runs a virtual appliance in accordance with various aspects described herein.

Referencing FIG. 3, a block diagram illustrating an example, non-limiting embodiment of a system that runs a virtual appliance in accordance with various aspects described herein is shown. System 300 includes a virtual appliance 302 that is executed by microprocessor 304. Microprocessor can include a core 306 that performs the processing required to execute virtual appliance 302. In the embodiment shown in FIG. 3, core 306 can be dedicated to running virtual appliance 302. Microprocessor 304 can include other cores as well (not shown) and each core can be dedicated towards running a virtual appliance.

Figure 4:
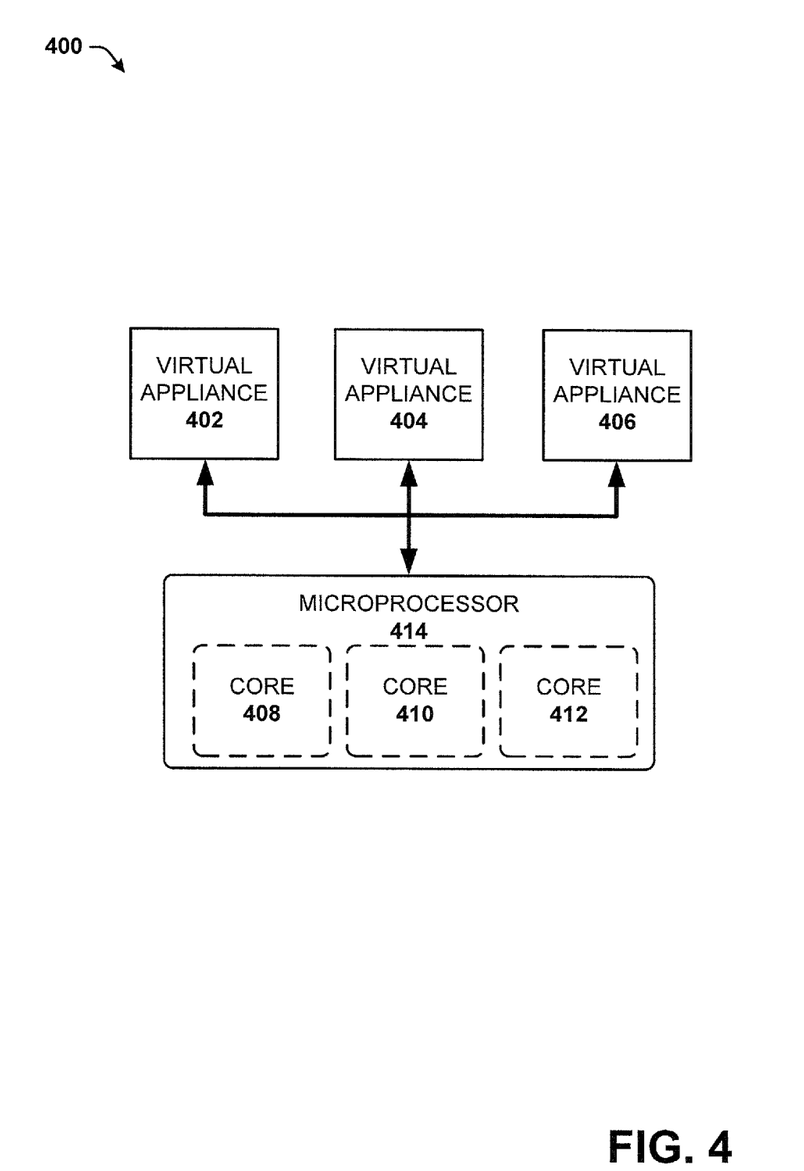
FIG. 4 is a block diagram illustrating an example, non-limiting embodiment of a system that runs a plurality of virtual appliances in accordance with various aspects described herein.

By contrast, in FIG. 4, an example, non-limiting embodiment of a system that runs a plurality of virtual appliances is shown. Microprocessor 414 can include three cores 408, 410, and 412. In other embodiments microprocessor 414 can include many more cores than the three depicted in FIG. 4. Microprocessor 414 facilitates the execution of virtual appliances 402, 404, and 406. It is to be appreciated also that any number of virtual appliances are possible in other embodiments. The number of virtual appliances can be constrained by the limits of processing power offered by microprocessor 414.

In some embodiments, each of the cores 408, 410, and 412 can be responsible for executing a corresponding virtual appliance (e.g., 402, 404, and 406 respectively). In other embodiments, a subset of the cores (e.g. core 408 alone, or cores 408 and 410) can facilitate the execution of virtual appliances 402, 404, and 406. Portions of the processing power of the cores can also be used to facilitate execution of the virtual appliances 402, 404, and 406. Cores or processing power left unused in executing the virtual appliances can be used to execute applications running in virtual machines managed by the hypervisor.

Figure 5:
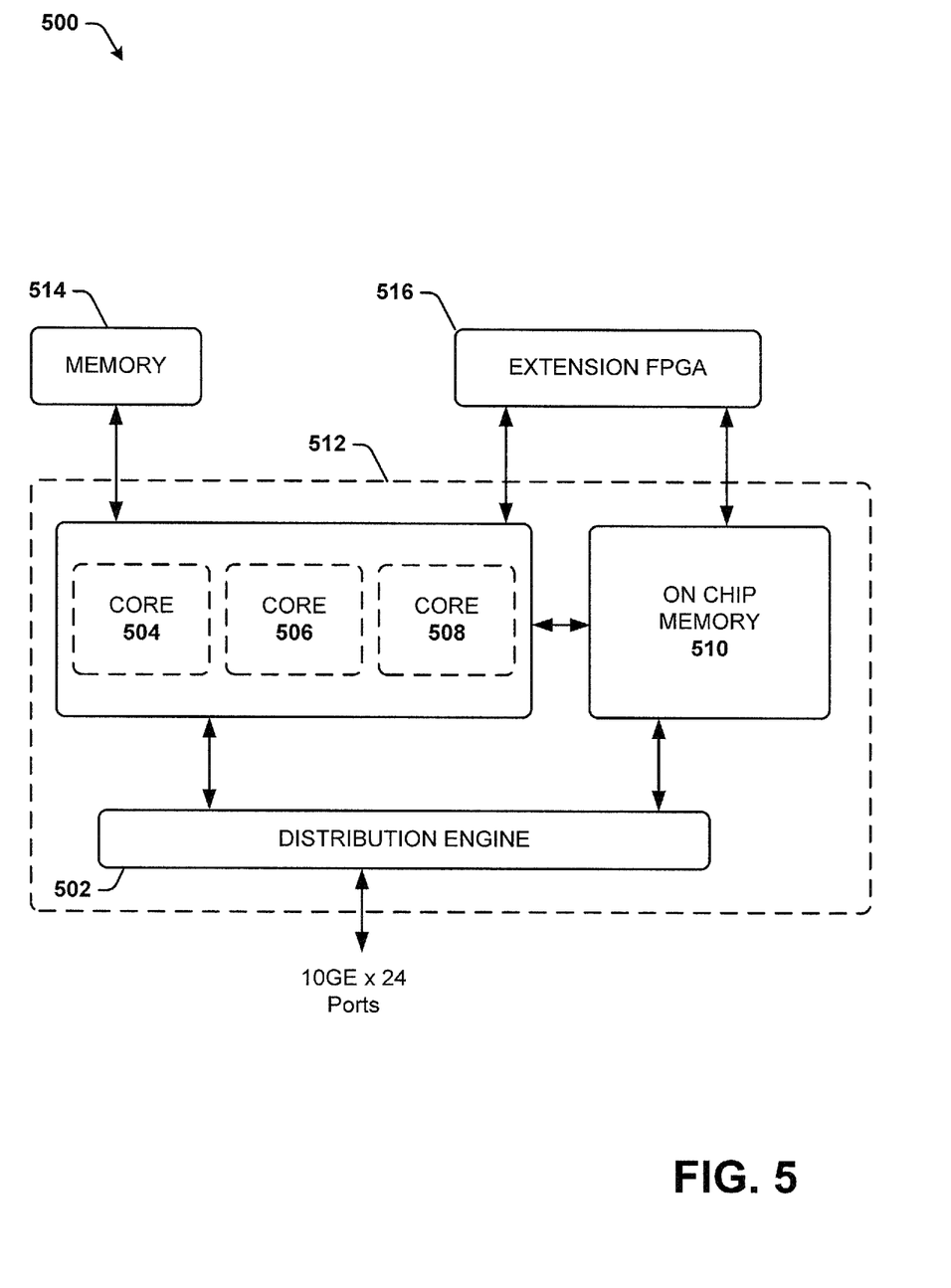
FIG. 5 is a block diagram illustrating an example, non-limiting embodiment of a system that executes a virtual appliance on a microprocessor in accordance with various aspects described herein.

Turning now to FIG. 5, a block diagram illustrating an example, non-limiting embodiment of a system that executes a virtual appliance on a microprocessor in accordance with various aspects described herein is shown. System 500 includes a microprocessor 512 that facilitates execution of virtual appliances that perform network services.

Microprocessor 512 includes a set of ARM64 style cores 504, 506, and 508 that perform processing for the microprocessor 512. In some embodiments microprocessor 512 can include as many as sixteen cores. In other embodiments, other numbers of cores are possible. Microprocessor 512 receives data and/or instructions to process via a flexible distribution engine 502 that has connections to a variety of ports. These ports can transfer data to and from storage, other microprocessors, and other networks (including the Internet). The flexible distribution engine 502 can then route the data that's received to either the cores 504-508 or the on chip memory 510 for short term storage.

The microprocessor 512 can include one or more memory interfaces to primary memory 514 or other types of secondary memories (not shown). The primary and secondary memories can include dynamic random access memory or memory storage (e.g., FLASH devices, solid state drives, hard drives, and etc.).

Microprocessor 512 can also include connections to additional chips such as other systems that can execute virtual appliances, or even extension FPGAs and ASICs. The extension devices can be stacked on the microprocessor 512 to provide additional processing headroom for some network services that require excessive processing.

Figure 6:
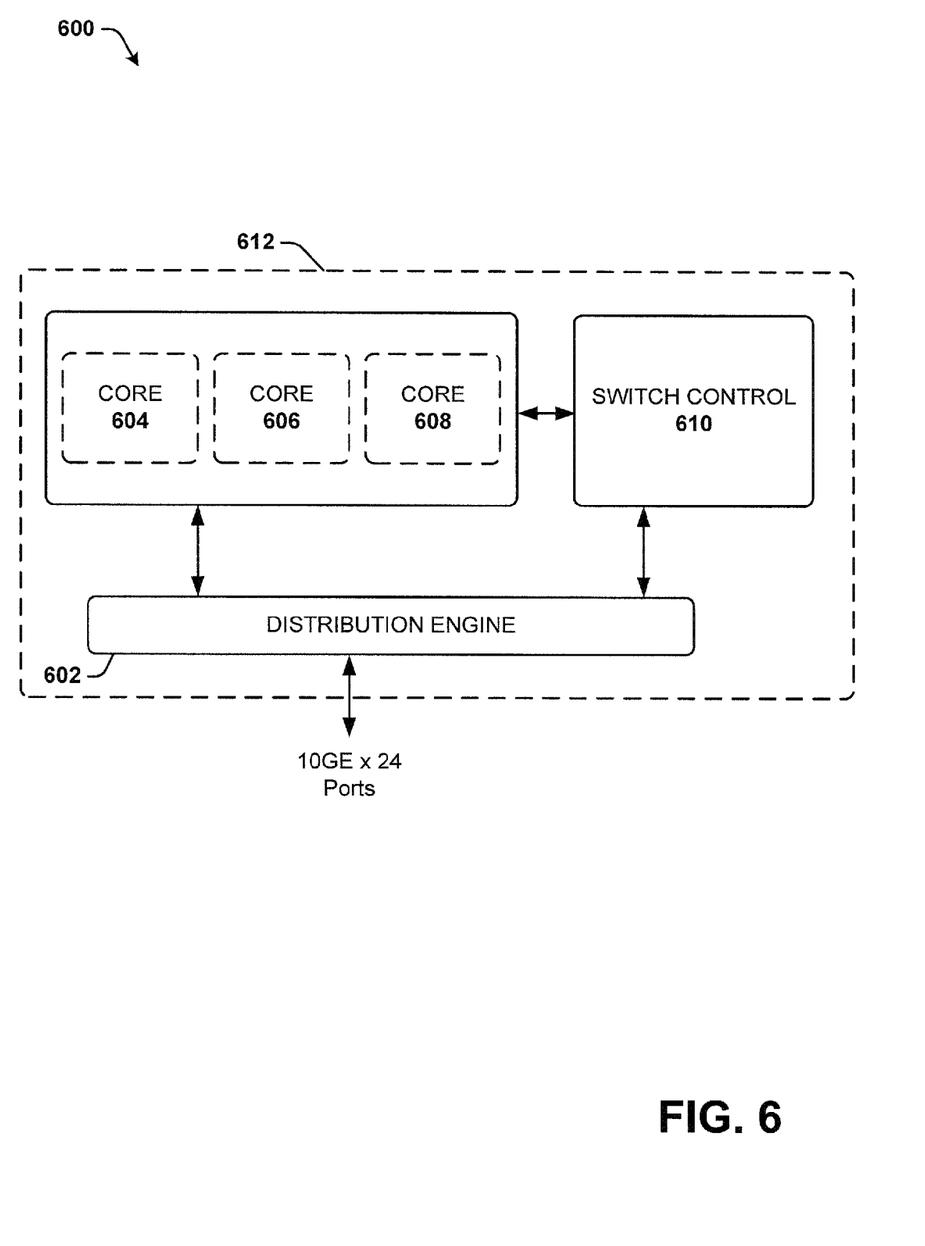
FIG. 6 is a block diagram illustrating an example, non-limiting embodiment of a system that executes a virtual appliance on a microprocessor in accordance with various aspects described herein.

Turning now to FIG. 6, a block diagram illustrating an example, non-limiting embodiment of a system that executes a virtual appliance on a microprocessor in accordance with various aspects described herein. System 600 includes a chip 612 facilitates execution of virtual appliances that perform network services.

Chip 612 includes a set of ARM64 style cores 504, 506, and 508 that perform processing for the microprocessor 512. Chip 612 receives data and/or instructions to process via a flexible distribution engine 602 that has connections to a variety of high bandwidth ports. These ports can transfer data to and from storage, other microprocessors, and other networks (including the Internet). The flexible distribution engine 602 can then route the data that's received to either the cores 604-608 or the switch control 610 that can distribute the data to the cores or other devices on the network. The switch control 610 can be a software defined switch that sends the data to the cores or onto the network. Once the packets reach the cores, they will get processed via the software running on the cores (the operating system, or hypervisor).

Figure 7:
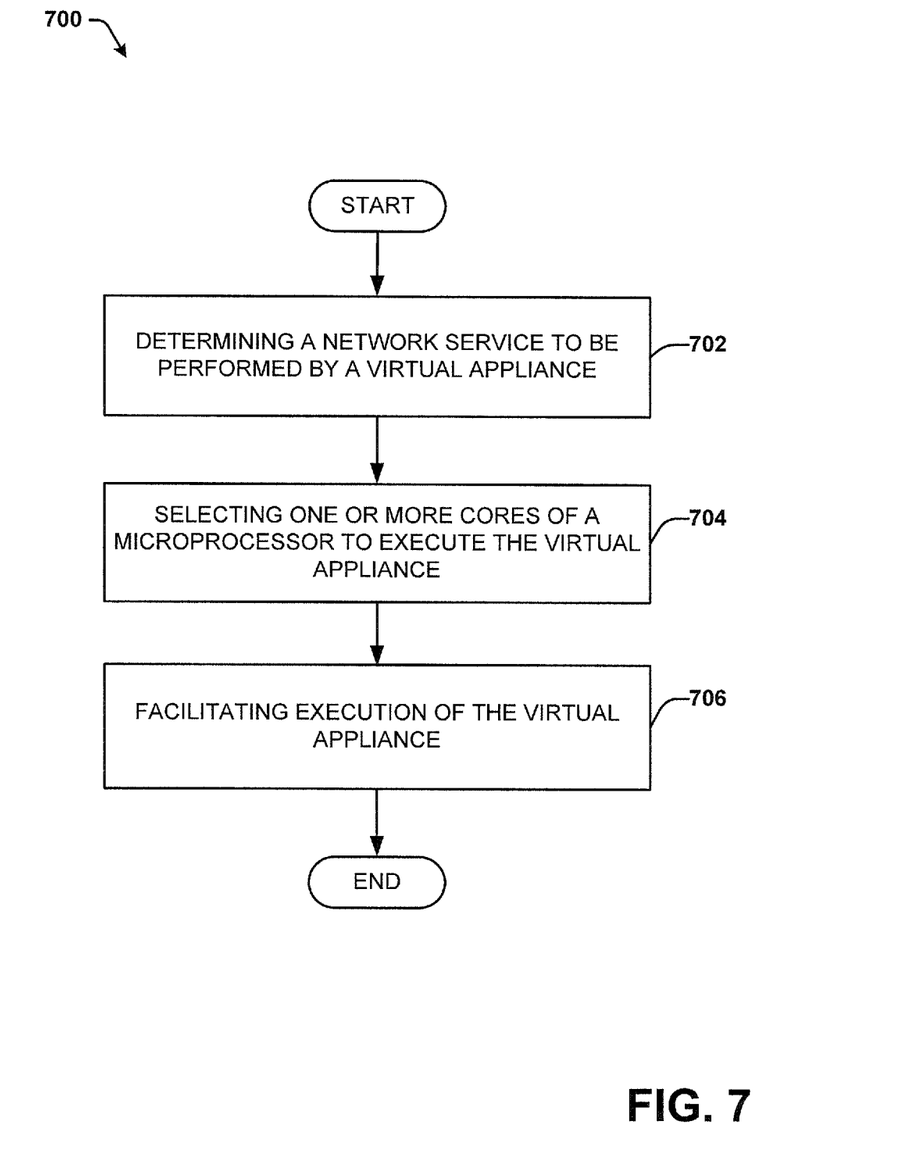
FIG. 7 illustrates a flow diagram of an example, non-limiting embodiment of a method for operating a virtual appliance to perform a network service.
Figure 8:
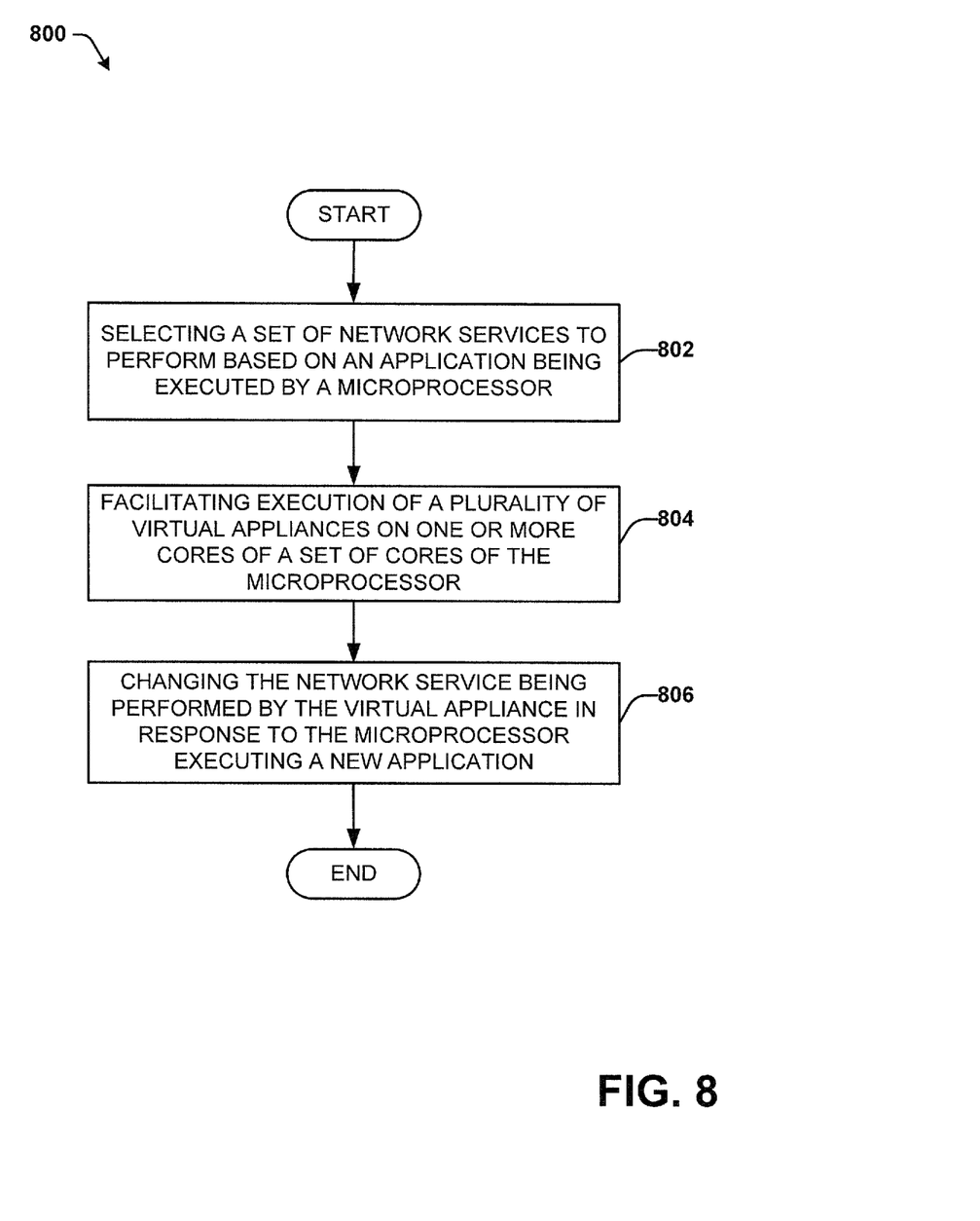
FIG. 8 illustrates a flow diagram of an example, non-limiting embodiment of a method for operating a virtual appliance to perform a network service.

In view of the example systems described above, methods that may be implemented in accordance with the described subject matter may be better appreciated with reference to the flow charts of FIGS. 7-8. While for purposes of simplicity, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring now to FIG. 7, a flow diagram of an example, non-limiting embodiment of a method for operating a virtual appliance to perform a network service is shown. Methodology 700 can start at 702, where a network service to be performed by a virtual appliance can be determined. Network services are tasks that are typically performed at the hardware level by dedicated ASICs and FPGAs. Such network services can include routing and switching services, firewall, VPN, SSL, and other security services, as well as load balancing and WAN optimizing. A determination of the network service to be performed can be based on the needs of the server at the time. For instance, if an application requires data to be transported over a secure connection, network services such as VPN and SSL can be utilized to provide the security functionality. In some embodiments, the determination about the network services to be performed can be based on the applications being run by the system. In other embodiments, the preference information from a user account can be used to determine which network service to perform.

At 704, one or more cores of a microprocessor are selected to execute the virtual appliance. The microprocessor can contain as many as 64 ARM64 cores. The number of cores dedicated to the executing the virtual appliance can be based on the processing load of the network service. Some network services such as load balancing or compression may require a larger number of cores to facilitate the execution of the virtual appliance.

At 706, the execution of the virtual appliance is facilitated. In some embodiments, a hypervisor, which is a piece of software running on the microprocessor that manages virtual machines, can facilitate the execution of the virtual appliance. Running the virtual appliance as a virtual machine allows the function, or personality of the virtual appliance to easily and flexibly change based on the requirements of the network.

Turning now to FIG. 8, a flow diagram of an example, non-limiting embodiment of a method for operating a virtual appliance to perform a network service is illustrated. Methodology 800 can start at 802, where a set of network service to perform is selected based on an application being executed by a microprocessor. If the application being executed requires secure transport of data, the virtual appliance can perform SSL or VPN services. Other services that can be performed include WAN optimizing, switching and routing, firewall services, and load balancing.

At 804, execution of a plurality of the virtual appliances is facilitated on one or more of the set of cores of the microprocessor. The virtual appliances can perform the network services that were selected to be performed. At 806, the network service being performed is changed in response to the microprocessor executing a new application. As the network service requirements change for the new application, the hypervisor can deactivate and activate virtual appliances as needed so that the correct network services are still performed.

Example Computing Environment

Figure 9:
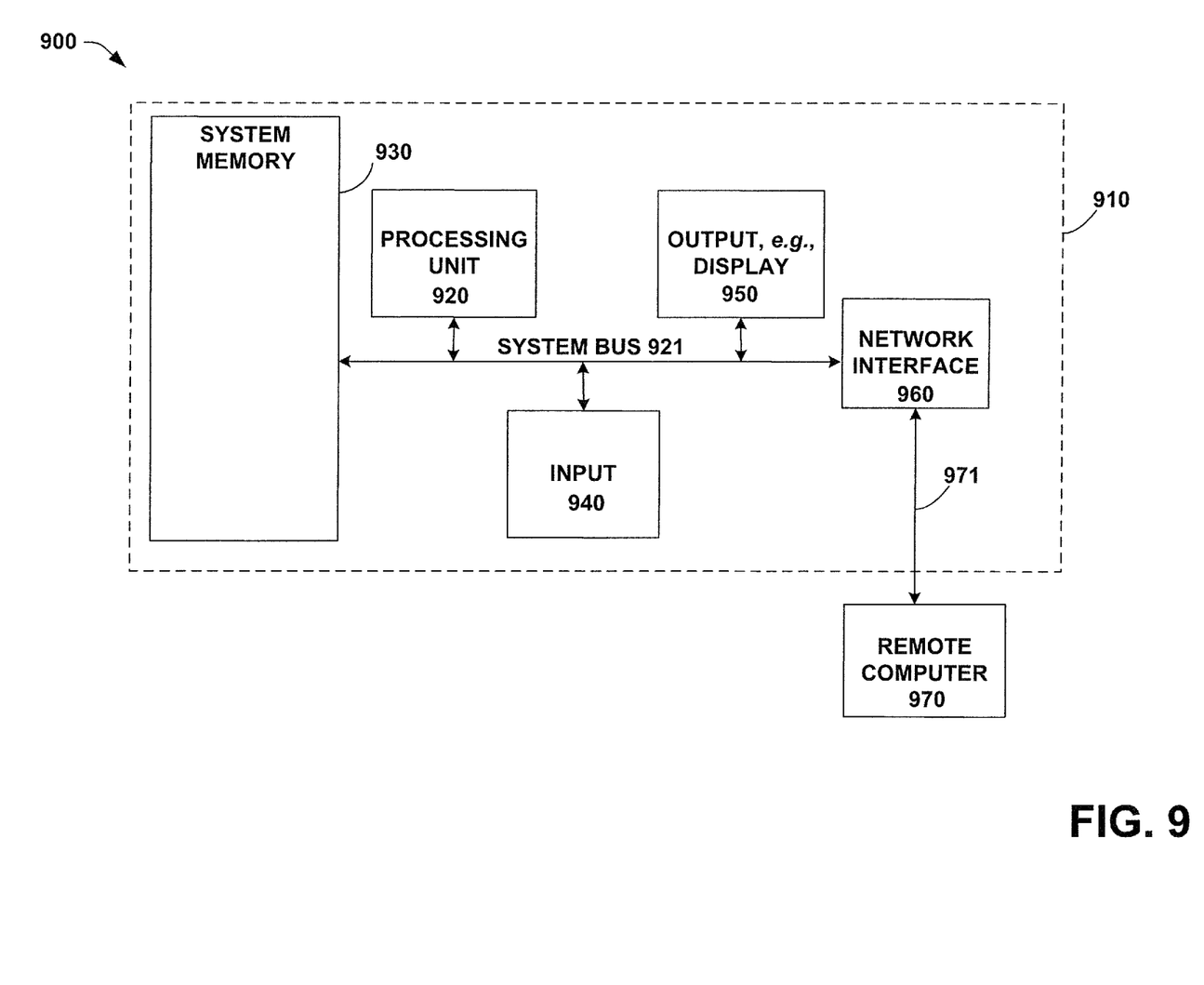
FIG. 9 illustrates a block diagram of an example electronic computing environment that can be implemented in conjunction with one or more aspects described herein.

As mentioned, advantageously, the techniques described herein can be applied to any device where it is desirable to facilitate the execution of virtual appliances that perform network services. It is to be understood, therefore, that handheld, portable and other computing devices and computing objects of all kinds are contemplated for use in connection with the various non-limiting embodiments, i.e., anywhere that a device may wish to share computing resources with a plurality of guest devices or virtual machines. Accordingly, the below general purpose remote computer described below in FIG. 9 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 9 thus illustrates an example of a suitable computing system environment 900 in which some aspects of the disclosed subject matter can be implemented, although as made clear above, the computing system environment 900 is only one example of a suitable computing environment for a device and is not intended to suggest any limitation as to the scope of use or functionality of the disclosed subject matter. Neither should the computing environment 900 be interpreted as having any dependency or requirement relating to any one or combination of components illustrated in the exemplary operating environment 900.

With reference to FIG. 9, an exemplary device for implementing the disclosed subject matter includes a general-purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures.

Computer 910 typically includes a variety of computer readable media. Computer readable media can be any available media that can be accessed by computer 910. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules, or other data in a modulated data signal such as a carrier wave or other transport mechanism and includes any information delivery media.

The system memory 930 may include computer storage media in the form of volatile and/or nonvolatile memory such as read only memory (ROM) and/or random access memory (RAM). A basic input/output system (BIOS), containing the basic routines that help to transfer information between elements within computer 910, such as during start-up, may be stored in memory 930. Memory 930 typically also contains data and/or program modules that are immediately accessible to and/or presently being operated on by processing unit 920. By way of example, and not limitation, memory 930 may also include an operating system, application programs, other program modules, and program data.

The computer 910 may also include other removable/non-removable, volatile/nonvolatile computer storage media. For example, computer 910 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 921 through a non-removable memory interface such as an interface, and a magnetic disk drive or optical disk drive is typically connected to the system bus 921 by a removable memory interface, such as an interface.

A user can enter commands and information into the computer 910 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 920 through user input 940 and associated interface(s) that are coupled to the system bus 921, but may be connected by other interface and bus structures, such as a parallel port, game port, or a universal serial bus (USB). A graphics subsystem can also be connected to the system bus 921. A projection unit in a projection display device, or a HUD in a viewing device or other type of display device can also be connected to the system bus 921 via an interface, such as output interface 950, which may in turn communicate with video memory. In addition to a monitor, computers can also include other peripheral output devices such as speakers which can be connected through output interface 950.

The computer 910 can operate in a networked or distributed environment using logical connections to one or more other remote computer(s), such as remote computer 970, which can in turn have media capabilities different from device 910. The remote computer 970 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 910. The logical connections depicted in FIG. 9 include a network 971, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 910 can be connected to the LAN 971 through a network interface or adapter. When used in a WAN networking environment, the computer 910 can typically include a communications component, such as a modem, or other means for establishing communications over the WAN, such as the Internet. A communications component, such as wireless communications component, a modem and so on, which can be internal or external, can be connected to the system bus 921 via the user input interface of input 940, or other appropriate mechanism. In a networked environment, program modules depicted relative to the computer 910, or portions thereof, can be stored in a remote memory storage device. It will be appreciated that the network connections shown and described are exemplary and other means of establishing a communications link between the computers can be used.

Example Networking Environment

Figure 10:
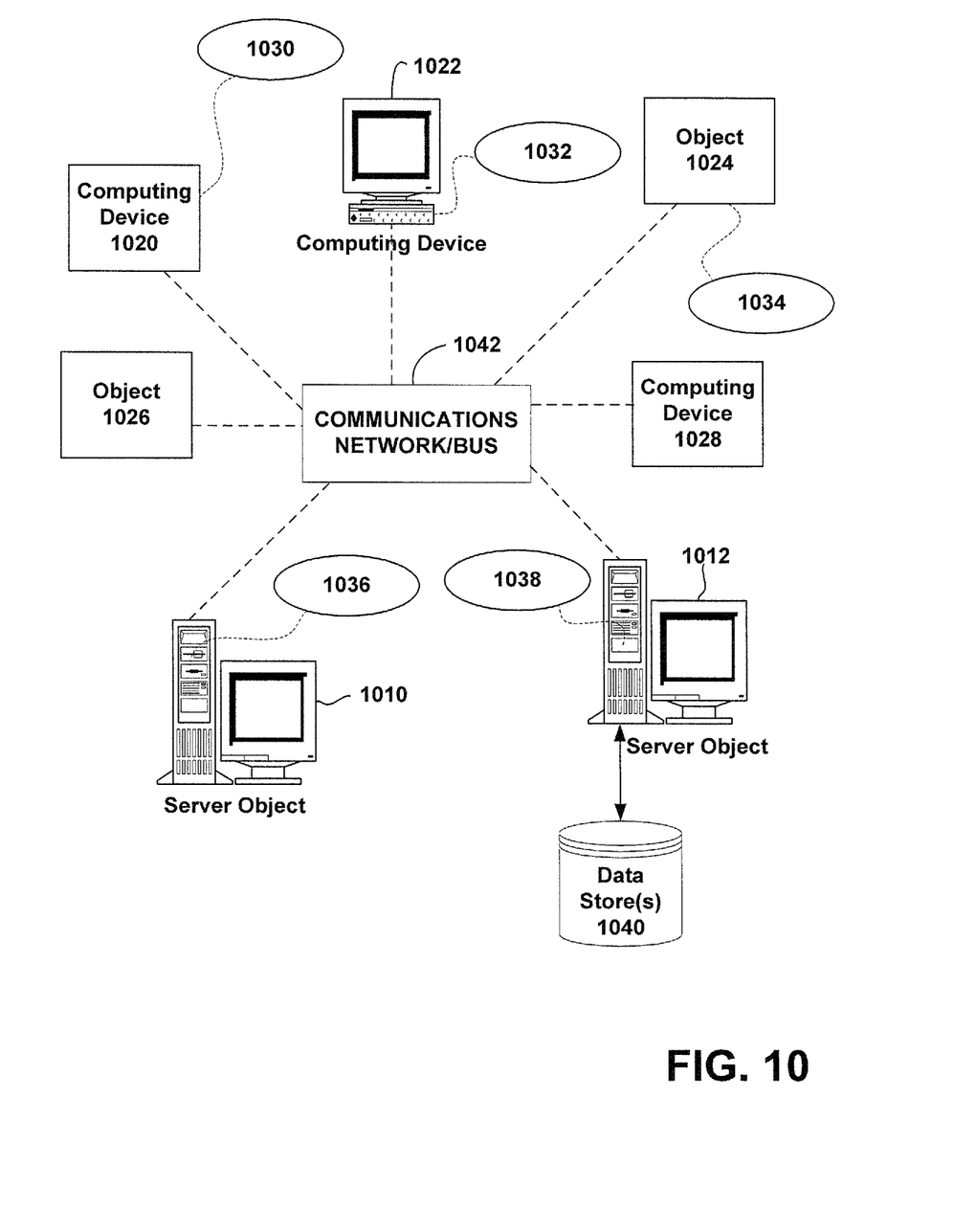
FIG. 10 illustrates a block diagram of an example data communication network that can be operable in conjunction with various aspects described herein.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038 and data store(s) 1040. It can be appreciated that computing objects 1010, 1012, etc. and computing objects or devices 1020, 1022, 1024, 1026, 1028, etc. may comprise different devices, including microprocessor 512, or similar devices depicted within the illustrations, or other devices such as a mobile phone, personal digital assistant (PDA), audio/video device, MP3 players, personal computer, laptop, etc. It should be further appreciated that data store(s) 1040 can include data store 108, or other similar data stores disclosed herein.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1042, either directly or indirectly. Even though illustrated as a single element in FIG. 10, communications network 1042 may comprise other computing objects and computing devices that provide services to the system of FIG. 10, and/or may represent multiple interconnected networks, which are not shown. Each computing object 1010, 1012, etc. or computing object or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc., acting as servers provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1042 or bus is the Internet, for example, the computing objects 1010, 1012, etc. can be Web servers with which other computing objects or devices 1020, 1022, 1024, 1026, 1028, etc. communicate via any of a number of known protocols, such as the hypertext transfer protocol (HTTP). Computing objects 1010, 1012, etc. acting as servers may also serve as clients, e.g., computing objects or devices 1020, 1022, 1024, 1026, 1028, etc., as may be characteristic of a distributed computing environment.

Reference throughout this specification to "one embodiment," "an embodiment," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, NAND and NOR memory refer to two types of flash memory based on the NAND and NOR logic gates that they respectively use. The NAND type is primarily used in main memory cards, USB flash drives, solid-state drives, and similar products, for general storage and transfer of data. The NOR type, which allows true random access and therefore direct code execution, is used as a replacement for the older EPROM and as an alternative to certain kinds of ROM applications. However, NOR flash memory can emulate ROM primarily at the machine code level; many digital designs need ROM (or PLA) structures for other uses, often at significantly higher speeds than (economical) flash memory may achieve. NAND or NOR flash memory is also often used to store configuration data in numerous digital products, a task previously made possible by EEPROMs or battery-powered static RAM.

As utilized herein, terms "component," "system," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

Other than where otherwise indicated, all numbers, values and/or expressions referring to quantities of items such as memory size, etc., used in the specification and claims are to be understood as modified in all instances by the term "about."

What is claimed is:

1. A system, comprising:
a microprocessor comprising a set of cores;
a virtual appliance configured for performing a network service;
a hypervisor configured for facilitating execution of the virtual appliance on one or more of the cores and for selecting the virtual appliance from a set of virtual appliances based on a function of the network service, wherein the network service for the virtual appliance to perform is one of a plurality of network services; and
wherein the hypervisor is configured for facilitating execution of a plurality of virtual appliances on the set of cores.

2. The system of claim 1, wherein the network services comprise at least one of load balancer services, switch services, SSL services, VPN services, router services, and firewall services.

3. The system of claim 1, wherein the virtual appliance further comprises a software defined networking switch.

4. The system of claim 1, wherein the plurality of virtual appliances are configured for performing a plurality of network services.

5. The system of claim 1, wherein the virtual appliance comprises access to a plurality of ports.

6. The system of claim 5, wherein the plurality ports comprise a plurality of at least one of the group consisting of: 1 gigabit ports and 10 gigabit Ethernet ports.

7. The system of claim 1, wherein the hypervisor is configured for selecting the network service for the virtual appliance to perform based on an application being executed by the microprocessor.

8. The system of claim 1, wherein the hypervisor is configured for changing the network service being performed by the virtual appliance in response to the microprocessor executing a new application.

9. The system of claim 1, wherein the hypervisor is configured for selecting the network service for the virtual appliance to perform based on information associated with a user account.

10. The system of claim 1, wherein the microprocessor comprises a 64 bit ARM processor.

11. A method, comprising:
determining a virtual appliance to perform a network service, wherein the virtual appliance is selected from a set of virtual appliances based on determining a function of the network service, wherein each virtual appliance of the set of virtual appliances performs a respective network service function;
selecting one or more cores of a microprocessor to execute the virtual appliance; and
facilitating execution of the virtual appliance.

12. The method of claim 11, wherein the determining the function of the network service comprises determining whether the network service is at least one of load balancing, switching services, SSL services, VPN services, router services, or firewall services.

13. The method of claim 11, further comprising facilitating execution of a plurality of virtual appliances on the one or more cores.

14. The method of claim 11, wherein determining the function of the network service further comprises selecting the network service for the virtual appliance to perform based on an application being executed by the microprocessor.

15. The method of claim 11, wherein determining the function of the network service further comprises selecting the network service for the virtual appliance to perform based on information associated with a user account.

16. The method of claim 11, further comprising changing the network service being performed by the virtual appliance in response to the microprocessor executing a new application.

17. A non-transitory computer readable storage device comprising computer-executable instructions that, in response to execution, cause a computing device to perform operations, comprising:
determining a virtual appliance to perform a network service, wherein the virtual appliance is selected from a set of virtual appliances based on determining a function of the network service, wherein each virtual appliance of the set of virtual appliances performs a respective network service;
selecting a virtual appliance to perform the network service;
selecting one or more cores of a microprocessor to execute the virtual appliance; and
facilitating execution of the virtual appliance.

18. The non-transitory computer readable storage device of claim 17, wherein the operations further comprise:
facilitating execution of a plurality of virtual appliances on the one or more cores.

19. The non-transitory computer readable storage device of claim 17, wherein the operations further comprise:
determining the function of the network service for the virtual appliances to perform based on an application being executed by a server.

* * * * *